United States Patent [19]

Rieck

[11] Patent Number: 4,578,258

[45] Date of Patent: Mar. 25, 1986

[54] PROCESS FOR THE PREPARATION OF CRYSTALLINE SHEET-TYPE ALKALI METAL SILICATES

[75] Inventor: Hans-Peter Rieck, Hofheim am Taunus, Fed. Rep. of Germany

[73] Assignee: Hoechst Aktiengesellschaft, Fed. Rep. of Germany

[21] Appl. No.: 688,184

[22] Filed: Jan. 2, 1985

[30] Foreign Application Priority Data

Jan. 4, 1984 [DE] Fed. Rep. of Germany ....... 3400132

[51] Int. Cl.$^4$ ............................................. C01B 33/20
[52] U.S. Cl. ................................... 423/325; 423/326; 423/327; 423/328; 423/329; 423/330; 423/332; 423/333
[58] Field of Search .............. 423/325, 328, 329, 332, 423/333

[56] References Cited

U.S. PATENT DOCUMENTS

| | | | |
|---|---|---|---|
| 4,285,922 | 8/1981 | Audeh et al. ...................... | 423/329 |
| 4,430,314 | 2/1984 | Audeh et al. ...................... | 423/326 |
| 4,481,174 | 11/1984 | Baacke et al. ..................... | 423/306 |

FOREIGN PATENT DOCUMENTS

| | | | |
|---|---|---|---|
| 0042225 | 12/1981 | European Pat. Off. ............ | 423/328 |
| 2742912 | 8/1979 | Fed. Rep. of Germany . | |
| 2125390 | 3/1984 | United Kingdom ................ | 423/328 |

OTHER PUBLICATIONS

Klaus Beneke and Gerhard Lagaly, "Kenyarle Synthesis and Properties" *American Mineralogist* vol. 68, pp. 818–826, (1983).
Eugster, *Science* 157:1177–1180, (1967).
Rooney, *Amer. Mineral*, 54:1034–1043, (1969).
Maglione et al., *C.R. Acad.Sci.* (Paris) Ser.D 277:1721–1724, (1973).
McAtee et al., *Amer. Mineral* 53:2061–2068, (1968).
McCulloch, *JACA* 74:2453–2456, (1952).
Legaly et al., *Proc. Int. Clay Conf.* 1972, 663–673, (1973).
Iler, *J.Colloid Sci.* 19:648–657, (1964).
Legaly et al., *Z.Naturforsch*, 28b:234–238, (1973).
Legaly et al., *Z.Naturforsch.* 346:666–674, (1979).
Heydemann, *Beitr. Min. Petrogr.* 20:242–259, (1964).
Mitsyuk et al., *Geochem. Int.* 13:101–111, (1976).
Benecko et al., *Z.Naturforsch*, 34b:648–649, (1979).
Legaly, *Adv.Colloid Interface Sci.* 11:105–148, (1979).

*Primary Examiner*—John Doll
*Assistant Examiner*—Jackson Leeds
*Attorney, Agent, or Firm*—Connolly and Hutz

[57] ABSTRACT

A process for the preparation of a crystalline sheet-type alkali metal silicate in an aqueous medium is described, in which an acidic compound is added to an amorphous alkali metal silicate, or an alkali metal silicate dissolved in water, having a molar ratio $M_2O/SiO_2$ (M=alkali metal) of 0.24 to 2.0, in an amount such that a molar ratio $M_2O$ (unneutralized)/$SiO_2$ of 0.05 to 0.239 is obtained. If required, the molar ratio $SiO_2/H_2O$ is adjusted from 1:5 to 1:100 by dilution, and the reaction mixture is kept at a reaction temperature of 70° to 250° C. until the sheet-type alkali metal silicate has crystallized out.

8 Claims, No Drawings

PROCESS FOR THE PREPARATION OF CRYSTALLINE SHEET-TYPE ALKALI METAL SILICATES

The invention relates to a process for the preparation of crystalline alkali metal silicates, having a sheet structure in an aqueous medium.

In addition to water-soluble alkali metal silicates (having a low $SiO_2$/alkali metal oxide ratio) and sparingly soluble amorphous alkali metal silicates, crystalline alkali metal silicates are also known. Among these, it is possible to differentiate between silicates having a framework structure (for example zeolites which are free of aluminum or at least have a low aluminum content) and silicates having a sheet structure. The term sheet structure is sometimes called layer structure.

Some crystalline alkali metal silicates having a sheet structure are found to occur naturally, while others have been synthesized. The alkali metal silicates having a sheet structure, in particular the sodium salts and the potassium salts, are usually synthesized from a silica gel, silica sol or precipitated silicic acid with the addition of an alkali metal hydroxide, in an aqueous system. In some cases, an appropriate carbonate solution is also used instead of an alkali metal hydroxide solution. The amount of alkali to be added depends on the product desired.

The present invention relates to a process for the preparation of a crystalline sheet-type alkali metal silicate in an aqueous medium, wherein an acidic compound is added to an alkali metal silicate dissolved in water, or an amorphous alkali metal silicate, having a molar ratio $M_2O/SiO_2$, where M represents an alkali metal, of 0.24 to 2.0, in an amount such that a molar ratio $M_2O$ (unneutralized)/$SiO_2$ of 0.05 to 0.239 is obtained, the molar ratio $SiO_2/H_2O$ is, if required, adjusted to 1:5 to 1:100 by dilution, and the reaction mixture is kept at a reaction temperature of 70° to 250° C. until the sheet-type alkali metal silicate has crystallized out. M preferably represents sodium or potassium. A preferred ratio of $Na_2O$ (not neutralized)/$SiO_2$ is from 1:5 to 1:7,5.

Soda waterglass having an $SiO_2$ content of about 22 to 37%, an $Na_2O$ content of 5 to 18% and an $Al_2O_3$ content of less than 0.5% is a preferred, very reactive starting compound which, being a large-scale industrial product, is readily available and economical. This is an alkali metal silicate dissolved in water. A soda waterglass containing 22–30% by weight of $SiO_2$ and 5–9% by weight of $Na_2O$ is particularly preferred. However, amorphous alkali metal silicates, in particular solid sodium silicates and potassium silicates, which may also be anhydrous but which are soluble in water, at least at the reaction temperature, can also be used.

The acidic compound added can be an anhydride or an acidic salt, such as sodium hydrogen sulfate. However, free organic or inorganic acids are preferably used. Inorganic acids, such as phosphoric acid or sulfuric acid, are particularly preferred.

The amount of acidic compound to be added depends on the starting silicate and on the end product desired. The end product formed virtually always has a lower $M_2O/SiO_2$ ratio than the reaction mixture from which it is formed. In the end products, the atomic ratio alkali metal/silicon is between about 1:4 and 1:11. The pH of the product mixture after the addition of the acidic compound is in general higher than 9. Preferably, a pH of between 10 and 12 is established. The addition of the acidic compound results in buffering of the reaction system.

Using the process according to the invention, it is possible to obtain pure products or mixtures of crystalline sheet-type alkali metal silicates. Zeolites, as impurities, form only when relatively large amounts of aluminum are present in the reaction mixture. Amorphous silica is found only when the reaction times are very short, while quartz is observed only for very long reaction times.

The sheet-type alkali metal silicates obtained possess an ion exchange capacity. Their X-ray defraction patterns are similar to those of known sheet-type alkali metal silicates.

In addition to the alkali metal ions, it is also possible for other metal ions to be present during the synthesis, for example germanium, aluminum, indium, arsenic and antimony, as well as the non metals boron and phosphorus. If the amount of these components is less than 10%, relative to the alkali metal content, the synthesis is not significantly affected. To prepare a pure sheet-type alkali metal silicate, or the free acid, it is advantageous if the addition of foreign metals during the synthesis is dispensed with. Pure sheet silicates containing a cation other than an alkali metal can readily be obtained in a further step, from the alkali metal salt by ion exchange, or from the corresponding free acid by neutralization.

As mentioned above, relatively large amounts of aluminum in the starting mixture can lead to the formation of zeolite by-products, generally of the ZSM-5 type or of the mordenite type. On the other hand, a low aluminum content, as is present in, for example, technical-grade waterglass, does not present problems.

The process according to the invention can also be carried out in the presence of small amounts of organic compounds; however, the procedure is preferably carried out without any organic compounds, especially without any non-acidic organic compounds. According to German Offenlegungsschrift No. 3,048,819, the mineral magadiite, $Na_2Si_{14}O_{29} \cdot X\ H_2O$, is formed in the synthesis of ZSM-5 in the presence of ethylenediamine. European Patent Application No. 42,225 states that, in the preparation of a zeolite of the ZSM-5 type in the presence of alcohols, the product is contaminated by a compound which resembles the mineral kenyaite $Na_2Si_{22}O_{45} \cdot X\ H_2O$. However, in this known process, the sheet silicate formed is obtained only in a small amount and as an undesired by-product.

For the process according to the invention, the molar ratio of $H_2O/SiO_2$ in the starting products is preferably from 8:1 to 40:1. For the preparation of sheet silicates having a low alkali metal content (atomic ratio of M/Si from 1:7 to 1:11), it is often advantageous if the dilution with water is greater than in the case of the preparation of the sheet silicates having a high alkali metal content (atomic ratio of M/Si about 1:4 to 1:7). The reaction temperature is preferably 130°–230° C., in particular 160°–210° C. Relatively long reaction times, high reaction temperatures and low ratios of alkali (unneutralized)/$SiO_2$ promote the formation of sheet silicates having a low alkali metal content. Short reaction times, low reaction temperatures and high alkali metal/Si ratios promote the formation of sheet silicates having a high alkali metal content.

The reaction time depends to a great extent on the reaction temperature. It can be less than 1 hour, it can also be several months. The optimum reaction time for the reaction temperature chosen can be determined by taking samples at various times during the reaction and examining these samples by an X-ray defraction method.

The reaction is preferably carried out in a pressure vessel, with thorough stirring. The addition of seed crystals is very advantageous since the purity of the product is improved and the reaction time shortened. However, the procedure can also be carried out without seed crystals.

In a batchwise reaction procedure, the amount of seed crystals can be up to 30% by weight, based on the proportion of $SiO_2$ in the added alkali metal silicate, i.e. the amorphous alkali metal silicate, or alkali metal silicate dissolved in water, which has been added. The addition of less than 0.01% by weight of seed crystals has no detectable effect. Instead of adding seed crystals, it may also be sufficient if the small residues from a previous batch remain in the reaction vessel. In the continuous reaction procedure, substantially higher concentrations of crystal nuclei (in steady-state equilibrium) have also proven advantageous.

The process according to the invention can be carried out batchwise, semi-continuously or continuously in apparatuses having flow-tube, stirred-kettle or cascade characteristics.

Below, the semi-continuous and fully continuous preparation of crystalline sheet-type alkali metal silicate in a stirred kettle, or in a cascade of stirred kettles, is to be described in more detail. The continuous embodiment of the process according to the invention is generally carried out at temperatures above 100° C. Because of the pressure generated above the aqueous reaction mixture, an autoclave is required in this case. Further increasing the pressure by adding an inert gas has no advantages. The temperature of the reaction mixture should be in the range from 70° to 250° C., in particular from 130° to 230° C., even during the addition of the reactants. This can be effected particularly easily if the substances added have already been heated up. The pressure in the reaction vessel should be less than 100 bar, in general in the range from 1 to 25 bar.

If the pressure in the stirred kettle is above 1 bar, a pump is required for metering in the reactants. A single pump may be sufficient for this purpose; however, it is also possible to add the individual components separately, so that 2 or even 3 pumps are required at various feed points of the autoclave. It is preferable if the acidic compound (for example sulfuric acid or phosphoric acid) and the basic reactants (water-soluble alkali metal silicates) are metered in separately, in order to avoid gel formation outside the reaction vessel. If the acidic compound is metered in excess, it may also be necessary to add an alkali.

The starting materials can be added in succession; however, simultaneous addition is preferred. If a plurality of reaction kettles connected in series are employed, it is advantageous if the time during which each component is added is 10 to 100%, in particular 20 to 80%, of the residence time in the first stirred kettle.

If product is not removed simultaneously during the addition, the content of the stirred vessel increases. The addition must then be terminated no later than when the maximum level is reached. When the components are added very rapidly, stirring must be continued in the reaction vessel in order to achieve adequate formation of the crystalline silicate by subsequent crystallization. The product is then removed from the still hot autoclave. However, it may be advantageous to carry out this subsequent crystallization in a further vessel, or in further vessels, which, if required, are likewise provided with stirrers, so that a cascade (of stirred kettles) results. The duration of subsequent crystallization should be no higher than 99 times, preferably no higher than 20 times, and in particular (at high temperatures above 200° C.) only 9 times, preferably less than 4 times, the average residence time in the first stirred kettle. It is possible to carry out the subsequent crystallization at temperatures which are substantially lower than that in the first stirred kettle.

In the continuous reaction procedure, it is advantageous if the autoclave is not emptied completely but always kept at least partially filled with product mixture, which consists of the crystallized silicate, the mother liquor and unconverted starting materials. Thus, a high proportion of silicate crystals remain in the autoclave and promote the further formation of crystalline silicate.

In the continuous reaction procedure, seed crystals are added only during the start-up period (to establish the equilibrium). During the reaction, the weight ratio of alkali metal silicate crystals to dissolved $SiO_2$ in the reaction mixture should be higher than 0.05, preferably higher than 0.1, and in particular higher than 0.2. In the completely continuous reaction procedure, constant values are maintained, these being in general higher than 1.0. In the semi-continuous reaction procedure, the value periodically exceeds and falls below a mean value.

In the completely continuous reaction procedure, and with ideal mixing, it is possible for substantially more crystalline than dissolved silicate to be present in the stirred kettle as well as in the product discharged.

If the product is to be removed from an autoclave which is still under pressure, this can be achieved by means of an appropriate outlet valve in the base. If complete emptying is not desired, the product is advantageously removed via a siphon tube which dips into the reaction mixture and is closed by means of a valve. The length of the siphon tube determines the maximum amount of product which can be removed.

Advantageously, the process according to the invention is carried out completely continuously. In addition to the continuous feed of the starting components, continuous discharge of the reaction products is necessary in this procedure. This can be effected, for example, by means of a siphon tube. In order to monitor the reaction vessel, it may be necessary to control the level by means of a level indicator or by determining the weight of the apparatus.

For economic reasons, both in batchwise operation and in the continuous procedure, the reaction time is generally such that at least 10%, in general, however, more than 70%, of the alkali metal silicate added is converted to the sheet-type alkali metal silicate. At higher reaction temperatures, short reaction times are required. At temperatures above 180° C., times of less than 1 hour are occasionally sufficient. However, reaction times of several days may also be necessary. The required reaction times, which depend on the particular reaction conditions, can be determined from X-ray diffraction patterns of individual samples. Using the process according to the invention, it is possible to prepare silicates which exclusively exhibit the X-ray reflections typical of crystalline sheet silicates.

The ratio of crystalline silicate (formed) to dissolved silicate (added) is determined mainly by the mean residence time and composition (in particular the molar ratio $M_2O/SiO_2$). Increasing the mean residence time increases the crystalline fraction but occasionally also promotes the formation of by-products. For economic reasons, it may be useful to employ shorter residence times and accept a smaller proportion of crystalline product.

In order to isolate the sheet silicate, the reaction mixture is filtered after the reaction, and the product is washed with water or dilute alkali (depending on the alkali metal silicate) and, if required, dried. However, it may also be advantageous for some forms of further processing if the filter-moist product is directly processed further, for example if the alkali metal ions are exchanged for other cations by treatment with salt solutions.

The alkali metal silicates prepared by the process according to the invention, and the free sheet silicic acids obtainable from these, can be used as adsorbents, analogously to the silicates of German Pat. No. 2,742,912.

It is surprising that, in the reaction of alkali metal silicate solutions, in particular waterglass solutions, with acidic compounds, such as, for example, sulfuric acid, crystalline silicates having a sheet structure can be obtained, instead of amorphous silica. Compared with the known processes for the preparation of sheet-type alkali metal silicates, the process according to the invention has the advantage of a comparatively shorter reaction time, which is attributable to the high reactivity of the water-soluble or amorphous alkali metal silicates employed.

EXAMPLE 1

A reaction mixture having the molar composition 0.303 $Na_2O$:0.0052 $Al_2O_3$:$SiO_2$:30 $H_2O$ is first prepared by adding 83.5 parts by weight of soda waterglass (27% of $SiO_2$, 8.43% of $Na_2O$ and 0.24% of $Al_2O_3$) to 149 parts of water. Some of a filter-moist crystalline sodium silicate from a previous experiment (71% weight loss as a result of heating to 1200° C.; only the amount of water was taken into account in calculating the molar composition) is then added. 4.93 parts of 96% strength sulfuric acid are then added slowly, while stirring. The reaction mixture then has the following molar composition: 0.174 $Na_2O$:0.0052 $Al_2O_3$:$SiO_2$:0.129 $Na_2SO_4$:30 $H_2O$.

The reaction mixture is heated to 205° C. in the course of 1.5 hours in a stainless autoclave, kept at this temperature for 2.5 hours and then slowly cooled. After it has been cooled, the reaction mixture is filtered, washed with water and sucked dry in a suction filter. The filter-moist product has a loss on ignition of 55%. The product is dried in the air for a short time and then examined thermogravimetrically. The weight loss which occurs up to a temperature of about 140° C. is 43%. Up to about 1000° C., no further significant decrease in weight is observed. The product dried to constant weight at 120° C., Na-SKS-1, has the following composition, determined by elemental analysis: 3.8% of Na, 0.24% of Al, 41.5% of Si and 0.003% of Fe. This gives a molar $SiO_2/Na_2O$ ratio of 17.9. The molar $SiO_2/Al_2O_3$ ratio of 332 shows that, in spite of the presence of dissolved $Al_2O_3$ in the reaction mixture, only very small amounts of $Al_2O_3$ are incorporated in the end product. The X-ray defraction pattern of the sodium silicate dried in the air (Na-SKS-1) is shown in Table 1.

TABLE 1

| d ($10^{-8}$ cm) | I/Io |
| --- | --- |
| 20.5 | 56 |
| 10.0 | 11 |
| 7.31 | 4 |
| 4.99 | 13 |
| 3.64 | 22 |
| 3.52 | 31 |
| 3.44 | 100 |
| 3.34 | 46 |
| 3.21 | 53 |
| 2.94 | 16 |

EXAMPLE 2

The crystalline Na silicate from Example 1 is extracted twice with 5% strength hydrochloric acid at 80° C. for 15 minutes. The X-ray diffraction pattern of the filter-moist product is shown in Table 3. Investigation by differential thermal analysis indicates a pronounced endothermic transformation at about 120° C. and a far less pronounced endothermic transformation at about 1180° C.

TABLE 2

| d ($10^{-8}$ cm) | I/Io |
| --- | --- |
| 16.1 | 19 |
| 7.89 | 5 |
| 5.21 | 12 |
| 3.85 | 15 |
| 3.53 (S) | 27 |
| 3.39 | 100 |
| 3.22 (S) | 17 |

S = Shoulder

EXAMPLE 3

An excess of sodium hydroxide solution is added to the product from Example 2. The X-ray defraction pattern of the product dried at 120° C. is shown in Table 4.

TABLE 3

| d ($10^{-8}$ cm) | I/Io |
| --- | --- |
| 19.8 | 62 |
| 9.87 | 13 |
| 7.31 | 5 |
| 6.37 | 3 |
| 4.98 | 11 |
| 4.69 | 10 |
| 4.27 | 9 |
| 3.66 | 19 |
| 3.50 | 31 |
| 3.44 | 100 |
| 3.35 | 44 |
| 3.33 | 44 |
| 3.21 | 47 |
| 2.94 | 8 |

EXAMPLE 4

10 g of the product from Example 1, which is dried in the air for a short time beforehand and has a loss on ignition of 44.2%, are added to 190 g of water, and titrated with 0.5M $H_2SO_4$. After each addition, sufficient time is allowed for the pH to become constant to the second decimal place. The duration of the titration is consequently several hours. Table 4 shows the titration values. In the graph, an equivalence value of 150 mmol of $Na^+$/100 g of ignited product is determined from the point of inflection of the curve at pH 4.5. An ion exchange capacity of about 95 mmol of $Na^+$/mol of SiO$_2$, corresponding to an SiO$_2$:Na$_2$O ratio, or an SiO$_2$/2H$^+$ ratio, of 21:1, is determined. Table 5 shows the X-ray defraction pattern after the titration and drying in the air.

TABLE 4

| ml of 0.5 M H$_2$SO$_4$ | pH | mmol of (exchanged) Na$^+$ ions/ 100 g of ignited product |
|---|---|---|
| 0.00 | 10.22 | 0.0 |
| 1.00 | 9.25 | 17.9 |
| 2.00 | 8.32 | 35.8 |
| 3.00 | 7.52 | 53.8 |
| 4.00 | 7.09 | 71.7 |
| 5.00 | 6.85 | 89.6 |
| 5.50 | 6.73 | 98.6 |
| 6.00 | 6.66 | 107.5 |
| 6.50 | 6.49 | 116.5 |
| 7.00 | 6.36 | 125.5 |
| 7.50 | 6.06 | 134.4 |
| 8.00 | 5.44 | 143.4 |
| 8.25 | 4.92 | 147.9 |
| 8.50 | 3.58 | 152.4 |
| 8.75 | 3.18 | 156.8 |
| 9.00 | 2.92 | 161.3 |
| 9.25 | 2.79 | 165.8 |
| 9.50 | 2.65 | 170.3 |
| 9.75 | 2.59 | 174.8 |
| 10.00 | 2.52 | 179.2 |
| 10.25 | 2.44 | 183.7 |
| 10.50 | 2.39 | 188.2 |
| 10.75 | 2.34 | 192.7 |
| 11.00 | 2.30 | 197.2 |
| 11.50 | 2.22 | 206.1 |
| 12.00 | 2.16 | 215.1 |

TABLE 5

X-ray diffraction pattern of H-SKS-1 (Example 4)

| d (10$^{-8}$ cm) | I/Io |
|---|---|
| 18.0 | 33 |
| 8.93 | 9 |
| 7.40 | 7 |
| 4.42 | 7 |
| 3.86 | 15 |
| 3.69 | 20 |
| 3.57 | 25 |
| 3.41 | 100 |
| 3.21 | 20 |

EXAMPLE 5

The titration of Example 4 is repeated, except that, instead of the water, 190 g of 5% strength NaCl solution are used. Table 6 shows the titration values. In the graph, an equivalence value of 145 mmol/100 g of ignited product is determined from the point of inflection of the curve at pH 3.75. From this, an ion exchange capacity of 91 mmol of Na$^+$/mol of SiO$_2$, corresponding to an SiO$_2$:Na$_2$O ratio, or an SiO$_2$/2H$^+$ ratio, of 22:1, is determined.

TABLE 6

| ml of 0.5 M H$_2$SO$_4$ | pH | mmol of (exchanged) Na$^{30}$ ions/ 100 g of ignited product |
|---|---|---|
| 0.00 | 8.87 | 0.0 |
| 0.5 | 8.01 | 8.9 |
| 1.0 | 7.49 | 17.8 |
| 1.5 | 7.00 | 26.6 |
| 2.0 | 6.63 | 35.5 |
| 2.5 | 6.16 | 44.4 |
| 3.0 | 6.14 | 53.3 |
| 3.5 | 5.83 | 62.1 |
| 4.0 | 5.66 | 71.0 |
| 4.5 | 5.47 | 79.9 |
| 5.0 | 5.36 | 88.8 |
| 5.5 | 5.29 | 97.7 |
| 6.0 | 5.22 | 106.5 |

TABLE 6-continued

| ml of 0.5 M H$_2$SO$_4$ | pH | mmol of (exchanged) Na$^{30}$ ions/ 100 g of ignited product |
|---|---|---|
| 6.5 | 5.18 | 115.4 |
| 7.0 | 5.08 | 124.3 |
| 7.5 | 4.84 | 133.2 |
| 8.0 | 4.20 | 142.0 |
| 8.5 | 2.96 | 150.9 |
| 9.0 | 2.53 | 159.8 |
| 9.5 | 2.30 | 168.7 |

EXAMPLE 6

Hydrochloric acid is added gradually to the sodium salt from Example 1 at room temperature in an amount such that a pH of 2.0 is obtained. The reaction mixture is stirred for about 15 minutes and filtered, and dilute hydrochloric acid is once again added to the residue from filtration until the pH reaches 2.0. The crystalline silicic acid formed is filtered off, washed twice with water thoroughly, filtered once again and sucked dry. The loss on ignition of the filter-moist product is 34.9%. 190 g of a 5% strength NaCl solution are added to 100 g of the moist silicic acid, and the mixture is then titrated with 1M NaOH. Table 7 shows the titration values. In the graph, an equivalence value of 155 meq/100 g of ignited product is determined from the point of inflection of the curve at pH 9.5. From this, an ion exchange capacity of about 94 mmol of H$^+$/mol of SiO$_2$, corresponding to an SiO$_2$:Na$_2$O ratio of 21:1, is determined.

TABLE 7

| ml of 1 M NaOH | pH | mmol of (exchanged) protons/ 100 g of ignited product |
|---|---|---|
| 0.00 | 3.26 | 0.0 |
| 1.00 | 4.98 | 15.4 |
| 2.00 | 5.40 | 30.7 |
| 3.00 | 5.60 | 46.1 |
| 4.00 | 5.68 | 61.4 |
| 5.00 | 5.84 | 76.8 |
| 6.00 | 6.19 | 92.1 |
| 6.50 | 6.46 | 99.8 |
| 7.00 | 6.76 | 107.5 |
| 7.50 | 7.08 | 115.2 |
| 8.00 | 7.37 | 122.9 |
| 8.50 | 7.76 | 130.5 |
| 9.00 | 8.25 | 138.2 |
| 9.25 | 8.55 | 142.0 |
| 9.50 | 8.77 | 145.9 |
| 9.75 | 9.10 | 149.7 |
| 10.10 | 9.60 | 155.1 |
| 10.25 | 9.78 | 157.4 |
| 10.50 | 9.93 | 161.2 |
| 10.75 | 10.30 | 165.1 |
| 11.00 | 10.58 | 168.9 |
| 11.25 | 10.75 | 172.8 |
| 11.50 | 10.95 | 176.6 |
| 11.75 | 11.09 | 180.4 |
| 12.00 | 11.21 | 184.3 |
| 12.25 | 11.29 | 188.1 |
| 12.50 | 11.36 | 192.0 |
| 13.00 | 11.54 | 199.6 |
| 13.50 | 11.63 | 207.3 |
| 14.00 | 11.70 | 215.0 |
| 15.00 | 11.84 | 230.3 |
| 16.00 | 11.88 | 245.7 |

EXAMPLE 7

A product having the same educt composition as that of Example 1 is prepared. Seed crystals of a magadiite-type silicate from a previous experiment are added to the reaction mixture. The reaction mixture is stirred for 19 hours at 165° C., cooled and then filtered, and the product is washed with water and sucked dry on a suction filter. 10 g of the mother liquor from the reaction mixture, diluted with 250 ml of water, have a pH of 10.4. The X-ray diffraction pattern of the product dried for a short time in the air (Na-SKS-2) is shown in Table 8. The filter-moist product, which loses 61.3% of its weight when ignited (>1000° C.), is titrated with sulfuric acid, analogously to Example 4. Table 9 shows the titration values. In the graph, an equivalence value of 215 meq/100 g of ignited product is determined from the point of inflection of the curve at pH 5.0. For a product having the composition $Na_2O.y\ SiO_2$, an ion exchange capacity of 138 mmol of $Na^+$/mol of $SiO_2$, corresponding to an $SiO_2:Na_2O$ ratio of 14.5:1, is determined from this. If the procedure is carried out in the absence of seed crystals, substantially longer reaction times are required.

TABLE 8

| d ($10^{-8}$ cm) | I/Io |
|---|---|
| 15.5 | 100 |
| 7.76 | 13 |
| 5.15 | 20 |
| 4.69 | 8 |
| 4.44 | 10 |
| 4.23 | 7 |
| 3.63 | 18 |
| 3.54 | 24 |
| 3.44 | 79 |
| 3.30 | 49 |
| 3.14 | 65 |
| 2.81 | 11 |
| 2.58 | 8 |
| 2.34 | 6 |

TABLE 9

| ml of 0.5 M $H_2SO_4$ | pH | mmol of (exchanged) $Na^+$ ions/ 100 g of ignited product |
|---|---|---|
| 0.00 | 10.59 | 0.0 |
| 1.00 | 9.81 | 25.8 |
| 2.00 | 9.13 | 51.7 |
| 3.00 | 7.28 | 77.5 |
| 4.45 | 6.73 | 115.0 |
| 5.00 | 6.61 | 129.2 |
| 6.00 | 6.54 | 155.0 |
| 7.00 | 6.40 | 180.8 |
| 8.00 | 6.01 | 206.7 |
| 8.50 | 3.97 | 219.6 |
| 9.00 | 2.95 | 232.5 |
| 9.25 | 2.76 | 239.0 |
| 9.50 | 2.65 | 245.4 |
| 9.75 | 2.55 | 251.9 |
| 10.00 | 2.48 | 258.2 |
| 10.50 | 2.34 | 271.7 |
| 11.00 | 2.16 | 297.1 |
| 12.00 | 2.09 | 310.0 |
| 12.50 | 2.03 | 322.9 |
| 13.00 | 1.98 | 335.8 |

EXAMPLE 8

100 g of moist product from Example 7 are added to 200 ml of 5% strength hydrochloric acid, and the mixture is stirred for 1.25 hours at room temperature. The product is filtered off and added once again to the same amount of hydrochloric acid, the mixture is stirred for 25 hours and filtered, and thorough washing with water is carried out twice, the product being stirred with water and being washed in the filtration procedure. (The X-ray spectrum of the product dried for a short time in the air is shown in Table 10). The product is then sucked dry. It has a loss on ignition of 57%. 10 g of the product which has been sucked dry are added to 190 ml of 5% strength NaCl solution, and the mixture is then titrated with 1M NaOH. Table 11 shows the titration values. In the graph, an equivalence value of 235 mmol of $H^+$/100 g of ignited product is determined from the point of inflection of the curve at pH 8.3. From this, an ion exchange capacity of about 144 meq/mol of $SiO_2$, corresponding to an $SiO_2:Na_2O$ ratio, or an $SiO_2/2H^+$ ratio, of 13.9:1, is determined.

For a natural as well as synthetic magadiite, the $SiO_2:Na_2O$ composition determined by elemental analysis is 13.4 to 14.4:1 (Lagaly et al., Am. Mineral., 60. 642–649 (1975)). The ratios of 14.5:1 and 13.9:1 determined from the ion exchange capacities of Na-SKS-2 (Example 7) and H-SKS-2 (Example 8), respectively, are in good agreement with these values.

TABLE 10

| d ($10^{-8}$ cm) | I/Io |
|---|---|
| 12.1 | 11 |
| 7.42 | 5 |
| 5.55 | 6 |
| 4.35 | 8 |
| 3.69 | 17 |
| 3.62 | 18 |
| 3.43 | 100 |
| 3.25 | 16 |
| 3.21 | 16 |
| 3.18 | 15 |

TABLE 11

| ml of 1 M NaOH | pH | mmol of (exchanged) protons/ 100 g of ignited product |
|---|---|---|
| 0.00 | 2.21 | 0.0 |
| 1.00 | 4.40 | 23.3 |
| 2.00 | 5.26 | 46.7 |
| 3.00 | 5.44 | 70.0 |
| 4.00 | 5.55 | 93.3 |
| 5.00 | 5.62 | 116.6 |
| 6.00 | 5.69 | 140.0 |
| 7.00 | 5.82 | 163.3 |
| 7.25 | 5.89 | 169.1 |
| 7.50 | 5.88 | 174.9 |
| 7.75 | 5.91 | 180.8 |
| 8.00 | 5.99 | 186.6 |
| 8.25 | 6.12 | 192.4 |
| 8.50 | 6.20 | 198.3 |
| 8.75 | 6.44 | 204.1 |
| 9.00 | 6.57 | 210.0 |
| 9.25 | 6.82 | 215.8 |
| 9.50 | 7.17 | 221.6 |
| 9.75 | 7.55 | 227.4 |
| 10.00 | 8.05 | 233.3 |
| 10.25 | 8.70 | 239.1 |
| 10.50 | 9.15 | 244.9 |
| 10.75 | 9.51 | 250.8 |
| 11.00 | 9.88 | 256.6 |
| 11.25 | 10.15 | 262.4 |
| 11.50 | 10.50 | 268.3 |

I claim:

1. A process for the preparation of a crystalline sheet-type alkali metal silicate in an aqueous medium, wherein an acidic compound is added to an amorphous alkali metal silicate, or an alkali metal silicate dissolved in water, having a molar ratio $M_2O/SiO_2$, where M represents an alkali metal, of 0.24 to 2.0, in an amount such that a molar ratio $M_2O$ (unneutralized)/$SiO_2$ of 0.05 to 0.239 is obtained, and the reaction mixture is kept at a reaction temperature of 70° to 250° C. until the sheet-type alkali metal silicate has crystallized out.

2. The process as claimed in claim 1, wherein soda waterglass is employed as the alkali metal silicate dissolved in water.

3. The process as claimed in claim 2, wherein the soda waterglass contains 22 to 30% by weight of $SiO_2$ and 5 to 9% by weight of $Na_2O$.

4. The process as claimed in claim 1, wherein the reaction temperature is 130° to 210° C.

5. The process as claimed in claim 1, wherein seed crystals of the crystalline sheet-type alkali metal silicate are added to the reaction mixture, in a weight ratio of 0.01 to 30%, relative to the amount of $SiO_2$ in the amorphous alkali metal silicate or the alkali metal silicate dissolved in water.

6. The process as claimed in claim 1, wherein the crystalline sheet-type alkali metal silicate which is prepared has an alkali metal/silicon ratio, M/Si, lower than 1:7.

7. The process as claimed in claim 6, wherein said ratio M/Si is 1:7 to 1:11.

8. The process as claimed in cliam 6, wherein the molar ratio $SiO_2/H_2O$ in the starting materials is adjusted by dilution to 1:5 to 1:100, if not already in this range.

* * * * *